United States Patent
Il

(10) Patent No.: US 7,852,508 B2
(45) Date of Patent: Dec. 14, 2010

(54) IMAGE FORMING APPARATUS

(75) Inventor: Shoichi Il, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1063 days.

(21) Appl. No.: 11/560,439

(22) Filed: Nov. 16, 2006

(65) Prior Publication Data

US 2007/0121164 A1    May 31, 2007

(30) Foreign Application Priority Data

Nov. 21, 2005   (JP)   ............................. 2005-335538

(51) Int. Cl.
*G06K 15/00*   (2006.01)
*G06F 3/12*   (2006.01)

(52) U.S. Cl. .................... 358/1.18; 358/1.9; 358/1.13
(58) Field of Classification Search .................. 358/1.1, 358/1.9, 1.11–1.18
See application file for complete search history.

(56) References Cited

U.S. PATENT DOCUMENTS 7,092,117 B2 *   8/2006   Kageyama et al.   ......... 358/1.18

FOREIGN PATENT DOCUMENTS

| JP | 10123881 A | 5/1998 |
|---|---|---|
| JP | 2001-051813 A | 2/2001 |
| JP | 2002158817 A | 5/2002 |
| JP | 2007019659 A | 1/2007 |

* cited by examiner

*Primary Examiner*—Thierry L Pham
(74) *Attorney, Agent, or Firm*—Panitch Schwarze Belisario & Nadel LLP

(57) ABSTRACT

An image image-processing section converts first information into second information, which is printed on paper. The first information is in a first page layout in which a first integral number of pages of the first information are laid out on a sheet of paper. A layout-commanding section switches the page layout from the first page layout to a second page layout in which a second integral number of pages of the first information are laid out on the paper. Upon switching from the first page layout to the second page layout in the middle of conversion of a page of the first information, the image-processing section converts at least that page such that the second information is in the first page layout, and then converts a remaining portion such that the second information is in the second page layout.

7 Claims, 15 Drawing Sheets

1-UP/SIMPLEX

4-UP/SIMPLEX

4-UP/SIMPLEX FROM 5TH PAGE

4-UP/SIMPLEX FROM 3RD PAGE

IMAGE FORMING APPARATUS

BACKGROUND OF THE INVENTION

1. Field of the Invention

The present invention relates to an image forming apparatus, and more particularly to an image forming apparatus that is capable of N-up printing where information for N pages of document information is printed on a single output page.

2. Description of the Related Art

Conventional image forming apparatuses including printers are in two types: The first is one in which inputted image data is output in sequence, and the second is one in which inputted image is temporarily stored in a memory of the apparatus and is then printed out in sequence in response to a command to output the image data. An example of the second type is a printer that performs secure printing. In secure printing, a printer receives a print job having authentication information over a communication line such as a network. The print job is stored into a memory section such as a hard disk. The authentication information is inputted from the operation panel of the printer. Printing is performed only when the authentication information coincides with the information previously stored in the memory.

Conventional image forming apparatuses suffer from a problem in that once a print job is stored into the apparatus, the image format to be printed out cannot be altered.

SUMMARY OF THE INVENTION

An object of the present invention is to provide an image forming apparatus in which when a print job stored in a memory section is being printed out, data still on a queue can be printed in a layout different from the data that has been printed out.

An image forming apparatus includes an image-processing section, an image forming section, and a layout-commanding section. The image-processing section converts the first information into second information, the first information being in a first page layout in which a first integral number of pages of the first information are laid out on a sheet of recording medium. The image forming section prints the second information on the sheet of recording medium. The layout-commanding section commands to switch the second information from the first page layout to a second page layout in which a second integral number of pages of the first information are laid out on the sheet of recording medium. When said image-forming section is converting a page of the first information into the second information, if said layout-commanding section commands to switch the second information from the first page layout to the second page layout, said image-processing section converts at least the page of the first information into the second information such that the second information is in the first page layout, and then converts a remaining portion of the first information into the second information such that the second information is in the second page layout.

The first integral number is 1 and the second integral number is greater than 1.

The image processing section includes a page counter that indicates a page number of the first information that is currently converted into the second information. When the image-processing section is converting a page of the first information into the second information, if said layout-commanding section commands to switch the second information from the first page layout to the second page layout, said image-processing section converts the first information into the second information such that the second information is in the first page layout until the counted page number becomes a multiple of the integral number of pages of the first information in the first page layout, and then converts a remaining portion of the first information into the second information such that the second information is in the second page layout.

The layout-commanding section is capable of commanding either simplex printing or duplex printing. When the layout-commanding section commands to switch the second information from the first page layout to the second page layout while also commanding to switch from simplex printing to duplex printing, said image-processing section continues to convert the first information into the second information such that the second information is in the first page layout until the counted number of page becomes a multiple of the integral number of pages of the first information in the first page layout, and then converts a remaining portion of the first information into the second information such that the second information is in the second page layout for said image forming section to perform duplex printing of the second information in the second page layout.

The image processing section performs conversion of a portion of the first information into the second information such that the second information is in the second page layout, the portion being one or more pages of the first information that were converted into the second information in the first page layout before the page layout was switched from the first page layout to the second page layout.

The integral number is n-th power of 2.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

In the specification, the term "document information" covers information in a document generated by an application program on a host apparatus such as a computer. The term "document page" covers each page of the document information. The term "printout information" covers information (e.g., bit map data) that should be printed out by an apparatus such as a printer. The term "output page" covers each page of the printout information.

Figure 1:
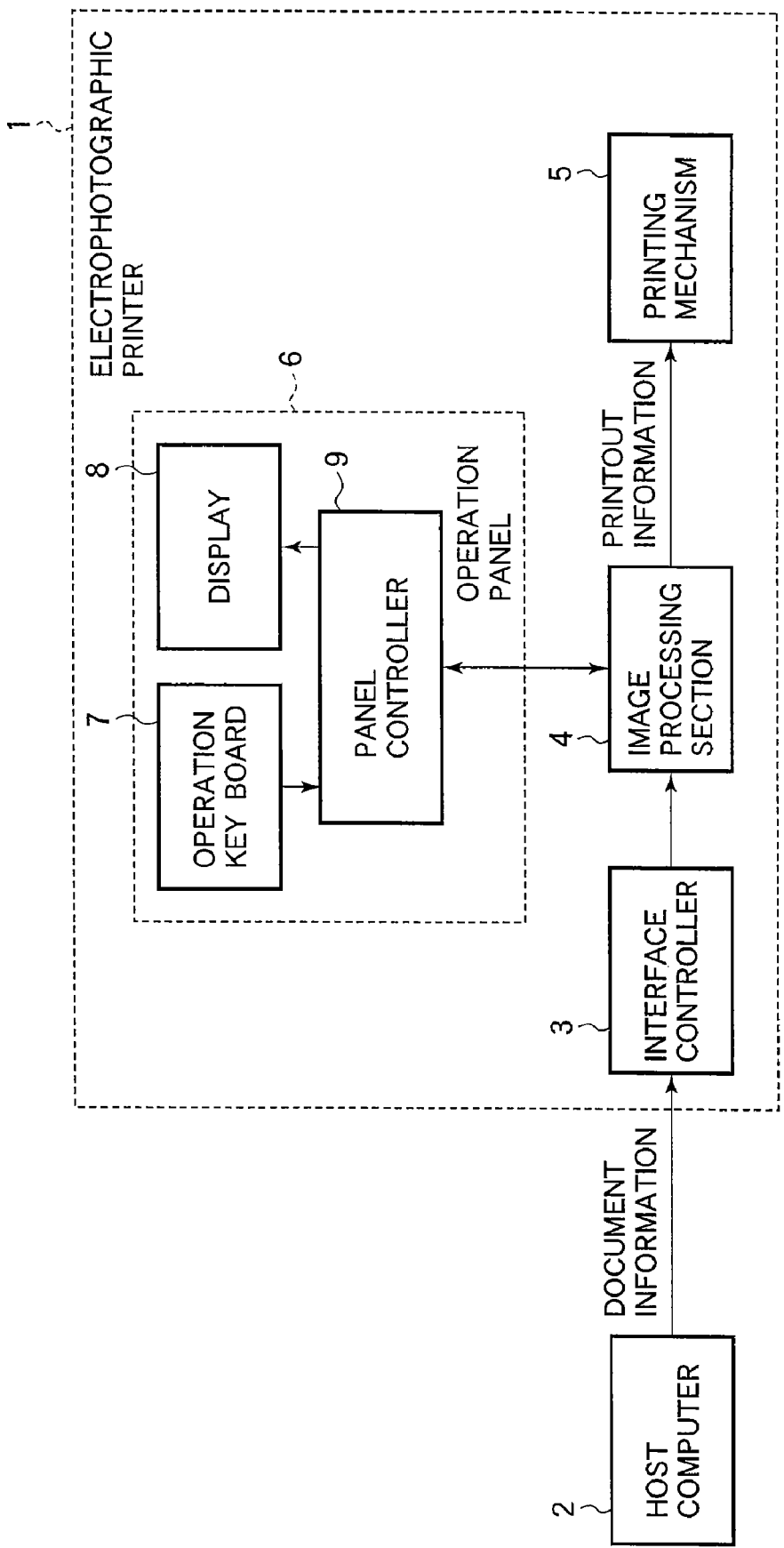
FIG. 1 is a block diagram illustrating a pertinent portion of an electrophotographic printer of a first embodiment according to the present invention.

FIG. 1 is a block diagram illustrating a pertinent portion of an electrophotographic printer 1 of a first embodiment according to the present invention.

Document information is produced by a printer driver, not shown, or by an application program, not shown, that operates on a host computer 2. The host computer 2 sends the document information to the electrophotographic printer 1. The electrophotographic printer 1 includes an interface controller 3, an image processing section 4, a printing mechanism 5 and an operation panel 6 through which a user can input a desired page layout. The interface controller 3 receives the document information from the host computer 2, and sends the document information to the image processing section 4. The image processing section 4 converts the document information into printout information having a format (e.g., bit map data) that can be printed by the printing mechanism 5, and sends the printout information to the printing mechanism 5. The printing mechanism 5 prints the printout information on a recording medium 33 (FIG. 3).

The operation panel 6 includes operation keys 7, a display 8, and a panel controller 9. The operation keys 7 include a plurality of operation keys that are operated by the user for setting various printing modes and for setting whether the current printing operation should be continued or discontinued. The display 8 takes the form of a liquid crystal display, and displays the necessary information to the user. The panel controller 9 detects a key that is operated by the user, sends information on the key to the image processing section 4, and displays various messages received from the image processing section 4.

Figure 2:
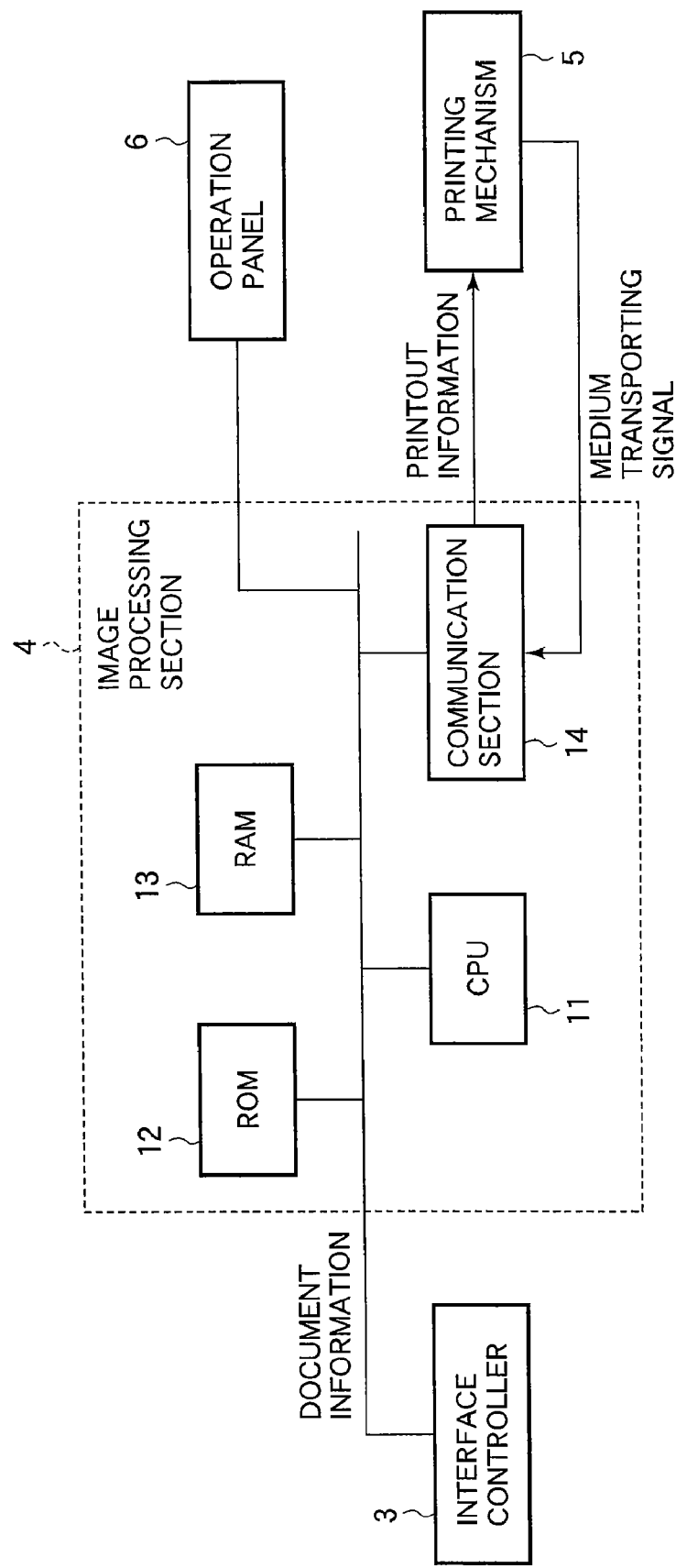
FIG. 2 is a block diagram illustrating a pertinent portion of the image processing section.

FIG. 2 is a block diagram illustrating a pertinent portion of the image processing section 4. Referring to FIG. 2, the image processing section 4 includes a CPU 11, a ROM 12, a RAM 13, and a communication section 14. The CPU 11 controls various forms of processing performed by the image processing section 4. The ROM 12 stores programs to be executed by the CPU 11. The RAM 13 temporarily stores the document information received from the interface controller 3, and the printout information that has been converted from the document information. The communication section 14 sends the printout information to the printing mechanism 5, and receives a medium transporting signal from the printing mechanism 5.

Figure 3:
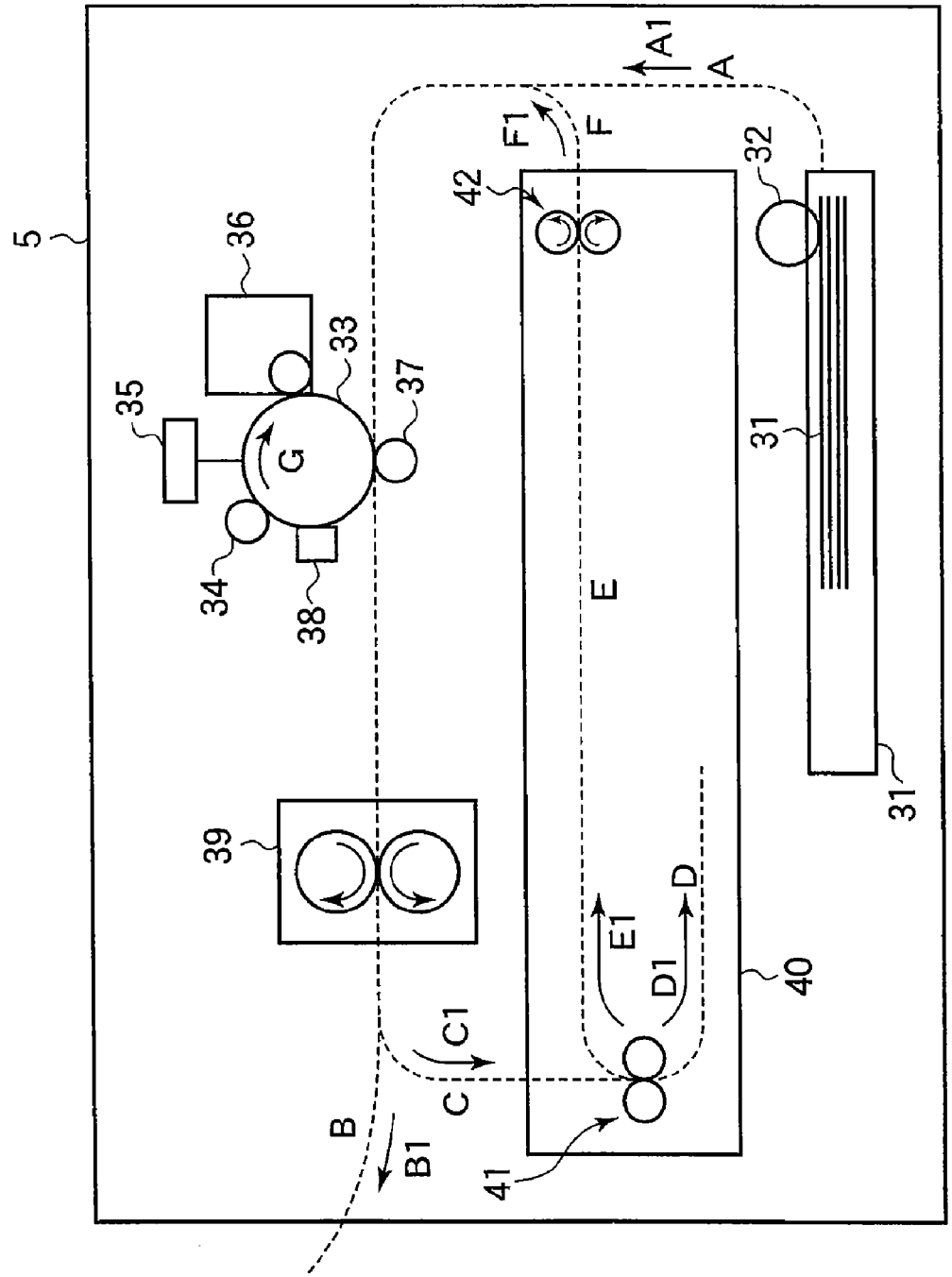
FIG. 3 is illustrates a pertinent portion of a printing mechanism.

FIG. 3 is illustrates a pertinent portion of the printing mechanism 5. Referring to FIG. 3, the printing mechanism 5 includes a medium cassette 30 that holds a stack of recording medium 31, a feed roller 32, a photoconductive body 33, a charging unit 34, an exposing unit 35, a developing unit 36, a transfer roller 37, a cleaning unit 38, a fixing unit 39, and a medium-flipping unit 40. The printing mechanism 5 further includes a controller that controls the respective sections, a motor, and a driving mechanism that is driven by the motor to transmit drive forces to the respective sections. Dotted lines A, B, C, D, E, and F represent transport paths of the recording medium 31.

The printing mechanism 5 of the aforementioned configuration operates in response to a command to initiate an image forming operation received from the communication section 14 in the image processing section 4 (FIG. 2).

The feed roller 32 rotates to feed one page of the recording medium 31 at a time in a direction shown by arrow A1 into the transport path A. In synchronism with the feeding of the recording medium 31 into the transport path A, the charging unit 34 begins to charge the surface of the photoconductive body 33 that rotates in a direction shown by arrow G. The exposing unit 35 illuminates the charged surface of the photoconductive body 33 in accordance with the printout information received from the image processing section 4, thereby forming an electrostatic latent image on the surface of the photoconductive body 33. Subsequently, the developing unit 36 develops the electrostatic latent image with toner into a toner image. The toner image is then transferred by the transfer section 37 onto the recording medium 31. After transfer of the toner image, the cleaning section 38 removes residual toner from the photoconductive body 33. Then, the charging section 34 again charges the photoconductive body 33 for the next cycle of image formation. The recording medium 31 having the toner image on it advances into the fixing unit 39 where the toner image is fused into the recording medium 31 by heat and pressure.

For simplex printing, the recording medium 31 discharged from the fixing unit 39 is discharged in a direction shown by arrow B1 onto a stacker, not shown, through the transport path B.

For duplex printing, the toner image on a front side of the recording medium 31 is fused into a permanent image. Then, the recording medium 31 is transported in a direction shown by arrow C1 into the medium-flipping section 40 through the transport path C. The recording medium 31 is then transported in a direction shown by arrow D1 by the medium-flipping roller 41 into the transport path D. Then, the direction of rotation of the medium-flipping roller 41 is reversed so that the recording medium 31 is transported in a direction shown by arrow E1 into the transport path E in the medium-flipping section 40 with a back side of the recording medium facing up. The recording medium 31 waits at a position where the recording medium 31 abuts a medium flipping roller 42 in the transport path E. Subsequently, when a command to initiate an image forming operation of the next page is received from the image processing section 4, the medium flipping roller 42 is driven into rotation to advance the recording medium 31 in a direction shown by arrow F1 into the transport path F. Then, another toner image is transferred onto the back side of the recording medium 31, then the toner image is fused, and finally the recording medium 31 is discharged onto the stacker through the transport path B.

Figure 4:
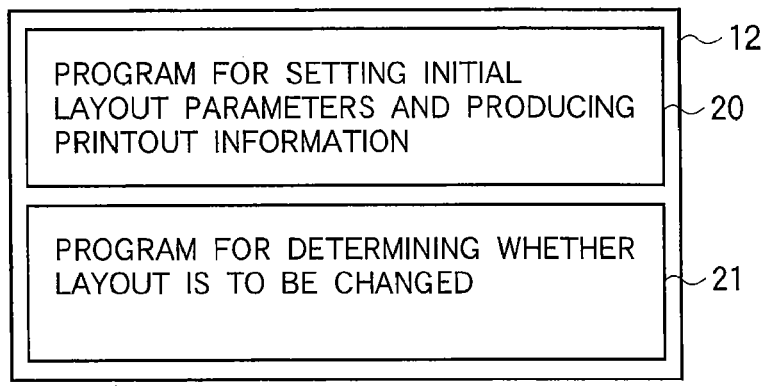
FIG. 4 illustrates the configuration of programs stored in a ROM.

FIG. 4 illustrates the configuration of programs stored in the ROM 12 of the image processing section 4. The configuration includes two programs: a program 20 for setting initial layout parameters (e.g., N-up and duplex printing/simplex printing) and for producing the printout information, and a program 21 for determining whether the page layout is to be changed.

Figure 5:
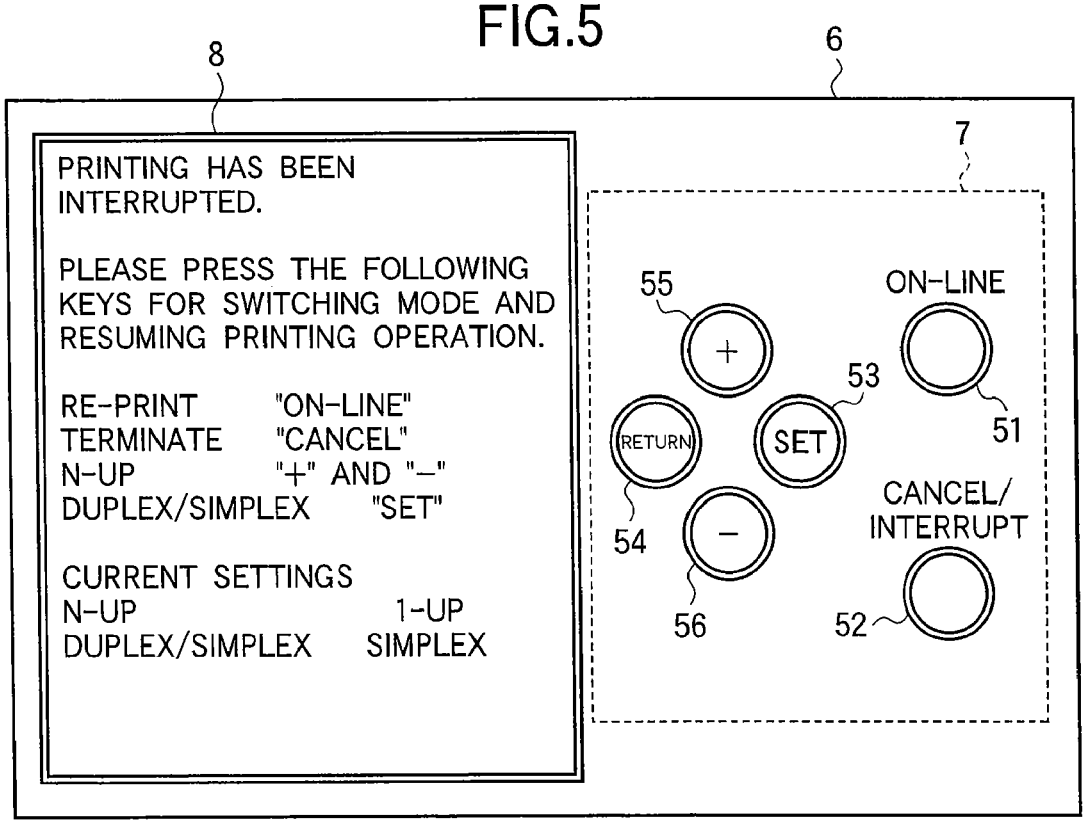
FIG. 5 illustrates an operation panel.

FIG. 5 illustrates an operation panel 6, and shows an example of the information displayed on the display 8 and the operation keys 7 through which the user inputs a change in page layout. The display 8 takes the form of a graphic liquid crystal display. The operation keys 7 include an ON-LINE key 51, a CANCEL/INTERRUPT key 52, a SET key 53, a RETURN key 54, a "+" key 55, and a "–" 56.

{Operation}

Figure 6:
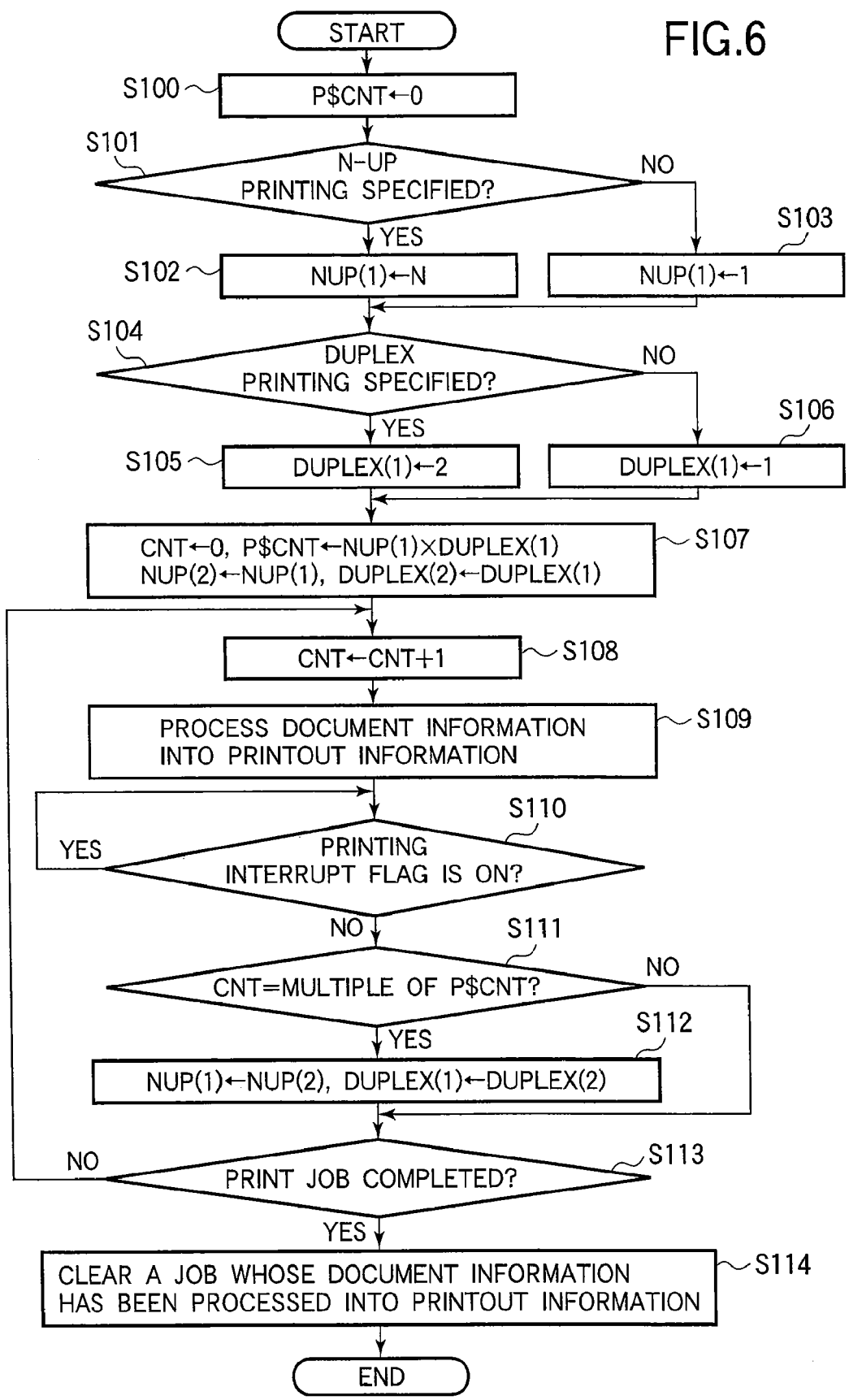
FIG. 6 is a flowchart illustrating a program for setting initial layout parameters and for processing document information into printout information.

A description will be given of the operation of the printer 1 of the aforementioned configuration with reference to FIGS. 1-3 and FIG. 6. The CPU 11 (FIG. 2) of the image processing section 4 processes the received document information under the control of a program stored in the ROM 12. FIG. 6 is a flowchart illustrating the program 20 (FIG. 4) for setting initial layout parameters and for processing the document information into the printout information.

The content of P$CNT is initialized, i.e., "0" is input into P$CNT (S100). The CPU 11 determines whether the document information received from the host computer 2 (FIG. 1) specifies N-up printing (S101). If YES, then a value of "N" is input into NUP(1) (S102). If NO, then "1" is input into NUP(1) (S103). NUP(1) is a variable that temporarily holds a layout parameter contained in the document information, indicating the number of pages "N" to be formatted side-by-side across an output page or a page of printout information (i.e., a sheet of paper). The content of NUP(1) is n-th power of 2 (e.g., 1, 2, 4, 8, ...)

A check is made to determine whether the document information received from the host computer 2 specifies duplex printing (S104). If YES at S104, it is determined that the document information specifies duplex printing, and therefore "2" is input into DUPLEX(1) (S105). If NO at S104, it is determined that the document information specifies simplex printing, and therefore "1" is input into DUPLEX(1) (S106). DUPLEX(1) is a variable of layout parameter indicative of whether the document information received from the host computer 2 specifies duplex printing or simplex printing. DUPLEX(1)=1 represents that the document information specifies simplex printing. DUPLEX(1)=2 indicates that the document information specifies duplex printing.

Then, the respective parameters are initialized (S107). That is, "0" is input into CNT. The contents of NUP(1) and DUPLEX(1) are input into NUP(2) and DUPLEX(2), respectively. The multiplication of DUPLEX(1) and NUP(1) is put into P$CNT.

CNT is a variable that serves as a page counter indicative of the page number of a document page that is currently being converted into the printout information.

NUP(2) is a variable indicative of the value of N in N-up printing. The value of N is an n-th power of 2 (e.g., 1, 2, 4, 8, etc). NUP(2) holds either the value of NUP(1) specified by the document information or the value of N specified by the user depending on the flow of the program in FIG. 6. When the user wishes to change the page layout, he inputs the value of N by operating the "+" key 55 and/or the "–" key 56.

DUPLEX(2) is a variable indicative of whether a print job is to be printed in the simplex printing mode or duplex printing mode. The content of DUPLEX(2) is inputted by the user by operating the SET key 53 when the user changes the page layout. DUPLEX(2)=1 represents simplex printing mode and DUPLEX(2)=2 indicates duplex printing mode.

P$CNT is a variable that holds a layout parameter indicative of the number of document pages that can be printed on a sheet of paper. The content of P$CNT is a product of the value of N of N-up printing and a value depending on the print mode, i.e., simplex printing or duplex printing. For example, if a print job specifies 2-up printing and duplex printing, P$CNT=2×2=4. If a print job specifies 2-up printing and simplex printing, P$CNT=2×1=2.

Then, CNT is incremented by "1" (S108). The received document information temporarily stored in the RAM 13 is converted into the printout information on a document page-by-document page basis in accordance with the contents in NUP(1) and DUPLEX(1). The printout information is then stored back into the RAM 13. The printout information is outputted from the RAM 13 on an output page-by-output page basis to the printing mechanism 5 (S109).

Output page is one physical page having a page layout such that N document pages specified by the content of NUP(1) are printed out side-by-side across the one physical page. For NUP(1)=1, an output page contains the same amount of information as one document page. For NUP(1)=4, an output page contains as large an amount of information as 4 document pages.

Upon completion of the conversion of one document page into the printout information, a check is made to determine whether a printing interrupt flag has been set (S110). If YES, then the program waits until the printing interrupt flag is cleared (S110). The printing interrupt flag is set when the user operates the keys on the operation keys 7 to switch page layout (e.g., from 1-up/simplex printing to 4-up/simplex printing).

The image processing section 4 makes a decision to determine whether the content of CNT is a multiple of that of P$CNT (S111). If YES, the image processing section 4 determines that the page layout can be switched beginning from the next output page. Thus, the image processing section 4 changes the layout parameter variables if switching of page layout has been commanded by the user. Specifically, the content of NUP(2) is input into NUP(1) and the content of DUPLEX(2) is input into DUPLEX(1). If NO at S111, the program jumps to S113.

Upon completion of the conversion of the document information into the printout information, a check is made to determine whether the print job has been completed (i.e., whether data for the next document page to be processed into the printout information exists in the print job) (S113). If NO, the program loops back to S108 for repeating S108-S112. If YES, the document information that was temporarily stored in the RAM 13 but has been printed out is cleared (S114). This completes printing of the print job.

Every time page or pages of the document information have been converted into one output page of printout information at S109, the CPU 11 (FIG. 2) causes the communication section 14 to drive the printing mechanism 5, thereby printing the output page of printout information. In response to the initiation of printing of an output page, transport of the recording medium 31 (FIG. 3) is initiated. The printing mechanism 5 sends the medium transporting signal to the communication section 4 in synchronism with the initiation of transport of the recording medium 31. The communication section 14 provides the printout information to the printing mechanism 5 in response to the medium transporting signal. The image forming operation performed by the printing mechanism 5 will be described as follows:

Referring to FIG. 3, the printing mechanism 5 receives the instruction for initiating the image forming operation from the communication section 14, and initiates an information printing operation. The feed roller 32 rotates to feed the recording medium 31 into the transport path A. The charging section 34 charges the photoconductive body 33 in synchronism with the feeding of the recording medium 31 into the transport path A. The exposing section 35 illuminates the charged surface of the photoconductive body 33 in accordance with the printout information received from the image processing section 4 (FIG. 4), thereby forming an electrostatic latent image on the photoconductive body 33. The developing section 36 develops the electrostatic latent image with toner into a toner image. The transfer section 37 transfers the toner image from the photoconductive body 33 onto the recording medium 31. After transfer of the toner image, the cleaning section 38 removes the residual toner from the photoconductive body 33. Then, the charging section 34 again charges the surface of the photoconductive body 33 for the next cycle of image formation. The recording medium 31 having the toner image on it advances to the fixing section 39 where the toner image is fused by heat and pressure into the recording medium 31.

For simplex printing, the recording medium 31 is discharged onto a stacker, not shown, via the transport path B.

For duplex printing, the toner image on a front side of the recording medium 31 is fused into a permanent image. Then, the recording medium 31 is transported in a direction shown by arrow C1 into the medium-flipping section 40 through the transport path C. The recording medium 31 is further sent by the medium-flipping roller 41 into the transport path E. Then, the recording medium 31 contacts the feed roller 42 provided in the transport path E, and enters its standby state at the end of the transport path E. Then, in response to another image forming instruction from the communication section 14 of the image processing section 4, the feed roller 42 is driven into rotation so that the recording medium 31 is fed into the transport path F. Thereafter, the toner image is transferred onto back side of the recording medium 31, and is then fused into the recording medium 31 by heat and pressure, which in turn is discharged onto the stacker via the transport path B.

Figure 8:
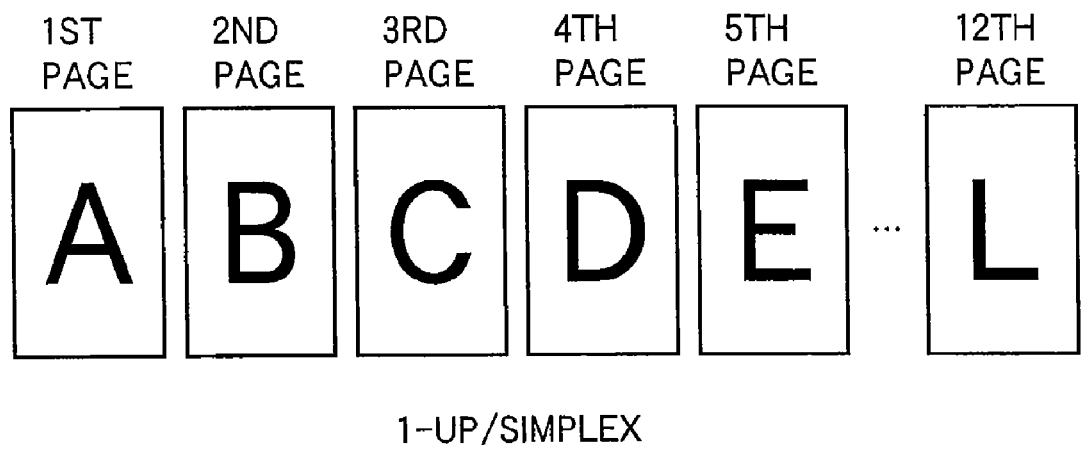
FIG. 8 illustrates an example of 1-up/simplex printing on a recording medium.
Figure 9:
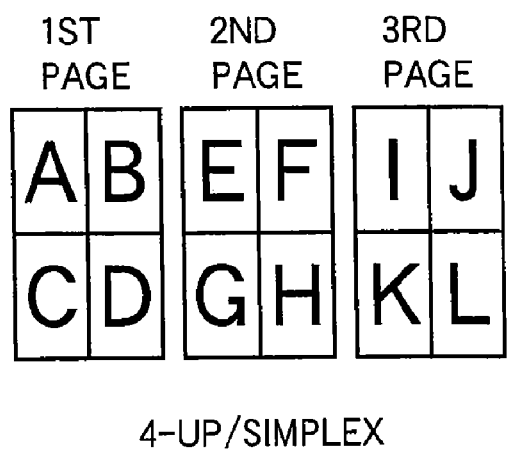
FIG. 9 illustrates an example of 4-up/simplex printing where 4 pages of the document information are laid out on a single page of the recording medium.

FIG. 8 illustrates an example of 1-up/simplex printing on the recording medium 31. FIG. 9 illustrates an example of 4-up/simplex printing where 4 document pages are laid out on a single page of the recording medium 31.

{Switching Page Layout}

A description will be given of how the page layout is switched during a printing operation.

FIG. 6 illustrates the operation in which image processing section 4 produces the printout information based on the document information received from the host computer 2.

When steps S101-S113 are being performed, if the CANCEL/INTERRUPT key 52 is depressed, the panel controller 9 notifies the image processing section 4 of the depression of the CANCEL/INTERRUPT key 52. Knowing the depression of the CANCEL/INTERRUPT key 52, the CPU 11 sends a message to the panel controller 9, which in turn displays the message on a display 8. FIG. 5 illustrates an example of the message. The message is, for example, "PRINTING HAS BEEN INTERRUPTED. PLEASE DEPRESS FOLLOWING KEYS FOR SWITCHING PRINTING MODE AND RESUMING PRINTING OPERATION". The page layout of the printed information on the recording medium may be switched as follows: The value of N for N-up printing may be set by means of the "+" key 55 and "−" key 56. Then, SET key 53 is pressed to toggle between duplex printing and simplex printing.

Figure 7:
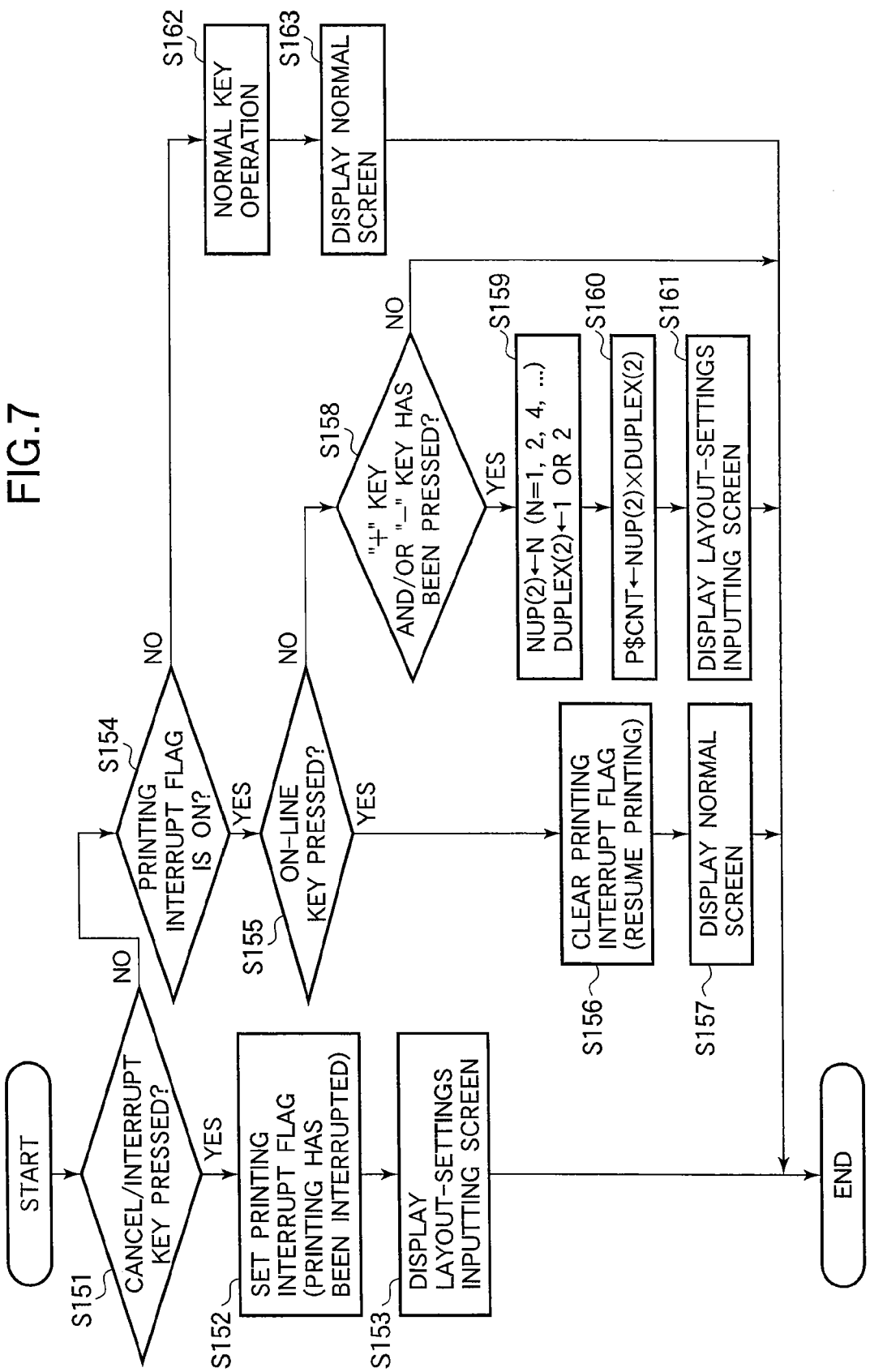
FIG. 7 is a flowchart that illustrates a program that detects new page layout when a user operates operation keys to switch page layout during a printing operation.

FIG. 7 is a flowchart that illustrates the program 21 (FIG. 4). The program 21 is activated every time any one of the operation keys 7 is operated. For example, the program 21 is activated when the CANCEL/INTERRUPT key 52 is operated, when the "+" key 55 and/or "−" key 56 is operated, or when the ON-LINE key 51 is operated. The program 21 detects new page layout information when the user operates the operation keys 7 to switch page layout during a printing operation.

The operation when the page layout is switched will be described with reference to FIG. 7 and FIGS. 1-3.

The CPU 11 makes a decision to determine whether the CANCEL/INTERRUPT key 52 has been pressed (S151). If YES, then the CPU 11 sets a print interrupt flag (S152), and then displays a layout-settings inputting screen on the display 8 (S153).

When the print interrupt flag has been set, it is determined that printing is interrupted at S110 in FIG. 6, so that the processing at S108-S113 remains interrupted until the print interrupt flag is cleared at S156.

If NO at S151, a check is made to determine whether the printing has been interrupted due to the print interrupt flag (S154) If YES, a check is made to determine whether an ON-LINE/RESUME key has been pressed (S155). If YES at S155, the CPU 11 calculates, based on the contents of NUP(2) and DUPLEX(2), the number of document pages that can be printed on a single output page, and puts the calculated number of document pages into P$CNT (S160). Then, the CPU 11 clears the print interrupt flag (S156), so that the processing interrupted at S110 i.e., conversion of the document information into the printout information on an output page-by-output page is resumed again. For example, when the print job has been interrupted, if the operator switches the page layout from one layout to another, the CPU 11 updates the content of P$CNT at S160. The updated content of P$CNT is then compared with the content of CNT at S111.

The display screen 8 is then switched from a layout-settings inputting screen to the normal display screen, not shown (S157).

If NO at S155, a check is made to determine whether the keys for inputting layout information ("+" key 55, "−" key 56, and SET key 53) have been pressed (S158). If NO, the program ends. If YES, the value of N is input into NUP(2), N being generated by pressing the "+" key 55 and "−" key 56 the necessary number of times (S159). Also, "1" or "2" is input into DUPLEX(2) by pressing the SET key 53. The value of "1" or "2" can be generated by pressing the SET key 53 to toggle between "1" and "2" (S159). The current settings (e.g., the value of N of N-up printing, and duplex/simplex printing) on the display 8 in FIG. 5 are updated according to the contents of NUP(2) and DUPLEX(2) (S161).

As described above, the contents of NUP(1) and DUPLEX (1) are initially set (step S102-S103 and S105-S106) prior to the conversion of the document information into the printout information. If the page layout is switched to a new page layout as illustrated in FIG. 7 during the conversion (FIG. 6) of the document information into the printout information, the contents of NUP(1) and DUPLEX(1) remain unchanged until the content of CNT becomes a multiple of a content of P$CNT after the user inputs a new page layout. The document information is converted into the printout information in accordance with the contents of NUP(2) and DUPLEX(2) only when the content of CNT becomes a multiple of that of P$CNT.

For example, assume the following parameters.

$n_i$: The number of pages of the document information that has been converted into the printout information before the user inputs a new page layout.

$n_k$: The number of pages of the document information to be converted before CNT reaches a multiple of the content of P$CNT after the user inputs the new page layout.

The conversion of the document information into the printout information in the new page layout begins from a page of the document information shortly after the value of $(n_i+n_k)$ becomes a multiple of the content of P$CNT. Thus, because $(n_i+n_k)$ is a multiple of the content of P$CNT, if re-print of the document information is performed, the page 1 to page $(n_i+n_k)$ of the document information may be printed in the new page layout such that the page 1 to page $(n_k+n_i)$ fit to as many physical sheets as $(n_i+n_k)$/P$CNT.

The following is a more specific example. Assume that the user inputs a new page layout in the middle of conversion of the document information into the printout information. Assume that the new page layout specifies 4-up printing and simplex printing, and pages 1 to 5 ($n_i$=5) of a total of 16 pages of the document information have been converted into the printout information in 1-up printing and simplex printing (i.e., P$CNT is 1×1=1). However, the conversion of the document information into the printout information is not switched to the new page layout immediately but the document information continues to be converted in 1-up printing and simplex printing up (i.e., P$CNT=4×1=4) for additional pages ($n_k$) so that a multiple number of pages of the document information has been converted in 1-up printing and simplex printing. In this example, $n_k$ is "3" (pages 6, 7, and 8). The conversion is performed in the new page layout beginning from page 9 of the document information. If re-print of the document information is performed in the new page layout, the page 1 to page 8 of the document information will be printed in the 4-up printing and simplex printing such that the pages 1 to 8 of the document information fit to 2 physical sheets $((n_i+n_k)$/P$CNT=(5+3)/4=2)$. In this manner, the user can obtain four printed sheets, each sheet being printed in 4-up printing and simplex.

The aforementioned processing will be described in more detail with reference to FIG. 10.

Figure 10:
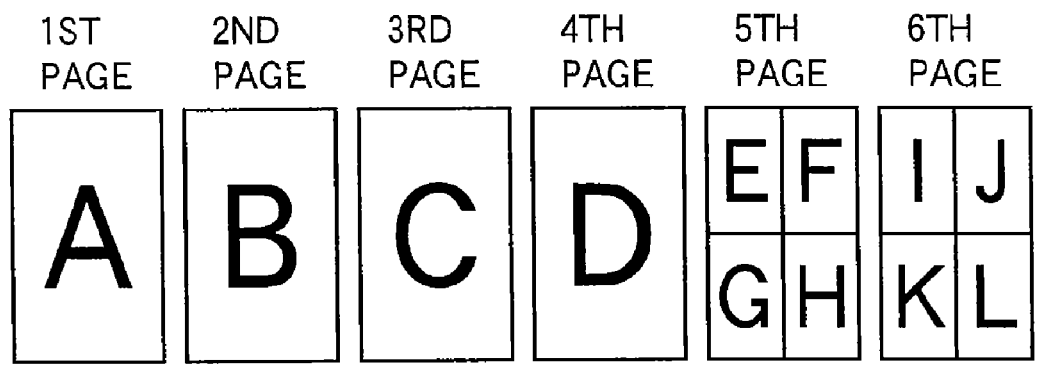
FIG. 10 illustrates an example of changing of page layout.

FIG. 10 illustrates an example of changing of page layout where a print job is switched from 1-up/simplex printing (i.e., NUP(1)=1 and DUPLEX(1)=1) to 4-up/simplex printing (i.e., NUP(2)=4 and DUPLEX(2)=1.

Assume that the user becomes aware of an error in page layout when the first or second document page is being converted into the printout information. If the user interrupts the print job as illustrated in FIG. 7 before the document information for the third output page is processed into the printout information, and switches to 4-up/simplex printing, the changes in page layout are withheld until the content of CNT is equal to that of P$CNT (=4) so that 4-up/simplex printing is performed for the fifth output page onward.

It is to be noted that the second output page of 4-up/simplex printing in FIG. 9 (4-up/simplex throughout the print job) is exactly the same as the fifth output page in FIG. 10 where the page layout is in 4-up/simplex.

In other words, when the user becomes aware of an error in page layout and makes a change in page layout in the middle of the print job, the page layout for the remaining output pages will be corrected. Thus, in order that all the output pages are printed in the correct page layout, it is only necessary to re-print the error pages in the correct page layout. In this manner, the correct output pages can be obtained faster if only the error pages are re-printed than if the print job in the erroneous page layout is interrupted and then entire print job is re-printed all over again in the correct page layout.

Figure 11:
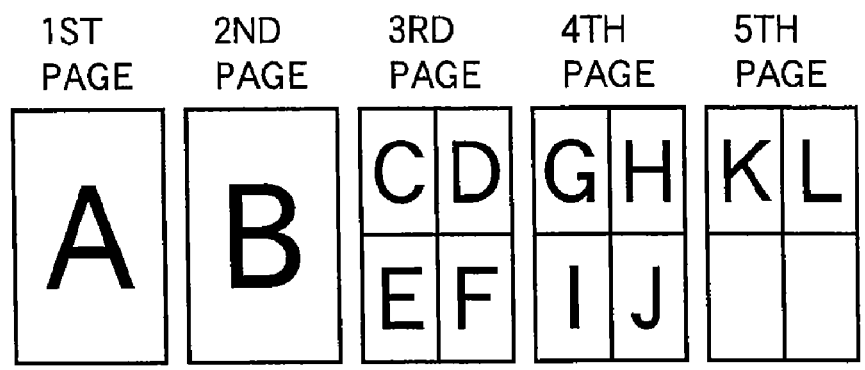
FIG. 11 illustrates an example of a page of printout information.

FIG. 11 illustrates another example of output page.

FIG. 11 illustrates an example of page layout when the page layout is switched to 4-up/simplex for the third page onward.

Referring to FIG. 11, a change in page layout is inputted by the user in the middle of the conversion of page "B" of the document information into the printout information, and is detected at S111, the change in page layout is actually effected beginning with document page "C" immediately next to document page "B". This processing can be performed by omitting S111 in FIG. 6 where the content of CNT is compared with that of P$CNT, and by inputting the content of NUP(2) into NUP(1) and the content of DUPLEX(2) into DUPLEX(1) at S112 in FIG. 6.

The print result for 4-up printing in FIG. 11 performed beginning with the third output page of a print job differs from that for 4-up/simplex printing in FIG. 9 performed throughout the print job. However, for example, 12 document pages require only 5 sheets in the print in FIG. 11 but 6 sheets in the print in FIG. 10. Thus, the print result in FIG. 11 may be effective if saving of recording medium is prime importance and the page layout need not be consistent throughout the print job.

As described above, whenever the user becomes aware of an error in page layout in the middle of the printing, then he makes a change in page layout such that the subsequent output pages can be printed in the correct page layout. It is only necessary to re-print the error output pages, thereby obtaining all the output pages in the correct page layout faster in this manner than in a manner in which all the output pages are re-printed. This also saves the number of waste pages.

Second Embodiment

Figure 12:
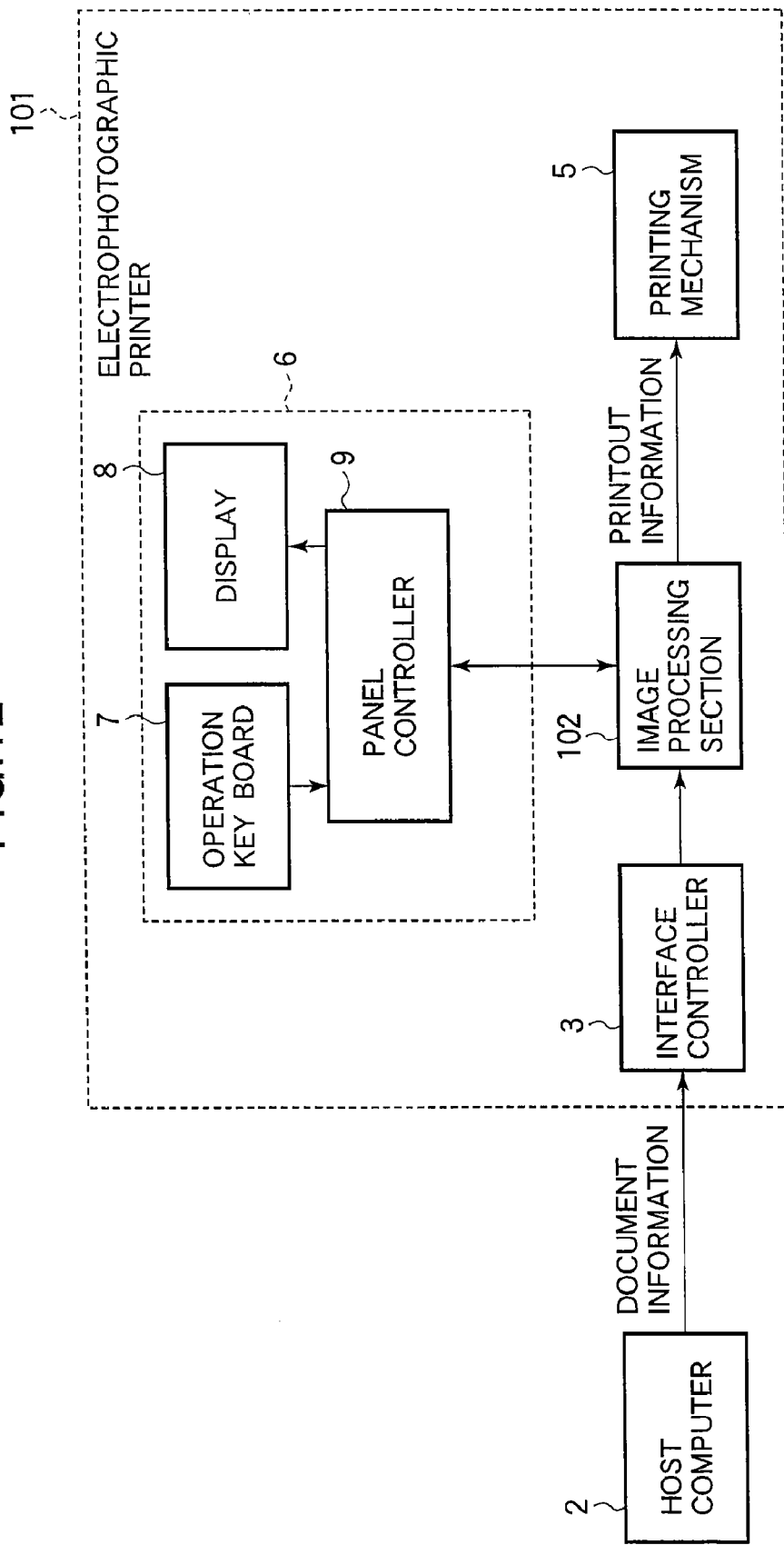
FIG. 12 is a block diagram illustrating a pertinent portion of an electrophotographic printer of a second embodiment.
Figure 13:
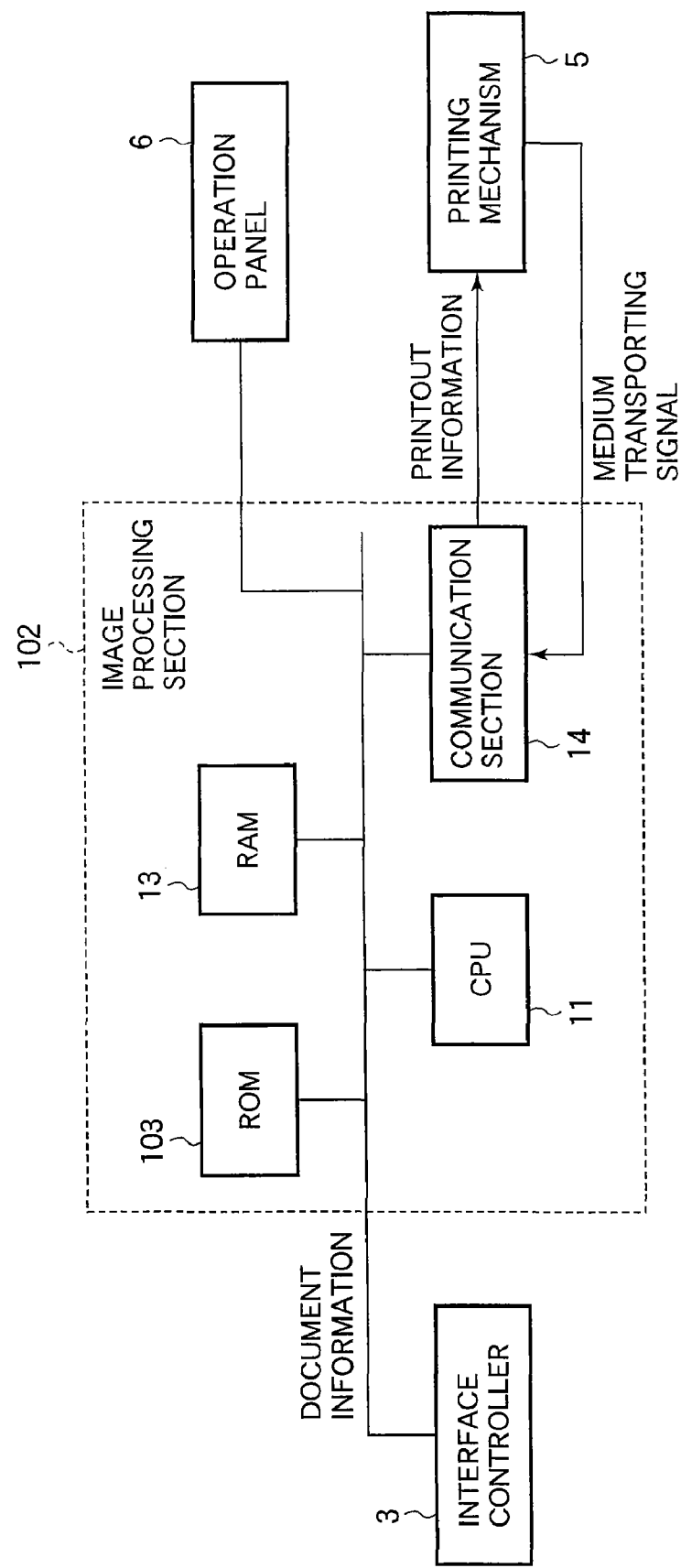
FIG. 13 is a block diagram illustrating a pertinent portion of an image processing section in FIG. 12.

FIG. 12 is a block diagram illustrating a pertinent portion of an electrophotographic printer 101 of a second embodiment. FIG. 13 is a block diagram illustrating a pertinent portion of an image processing section 102 in FIG. 12.

The electrophotographic printer 101 differs from the electrophotographic printer 1 of the first embodiment in that programs 110, 111, and 112 are stored in a ROM 103 of the image processing section 102. Elements similar to those in the first embodiment have been given similar reference numerals and their description is omitted.

Figure 14:
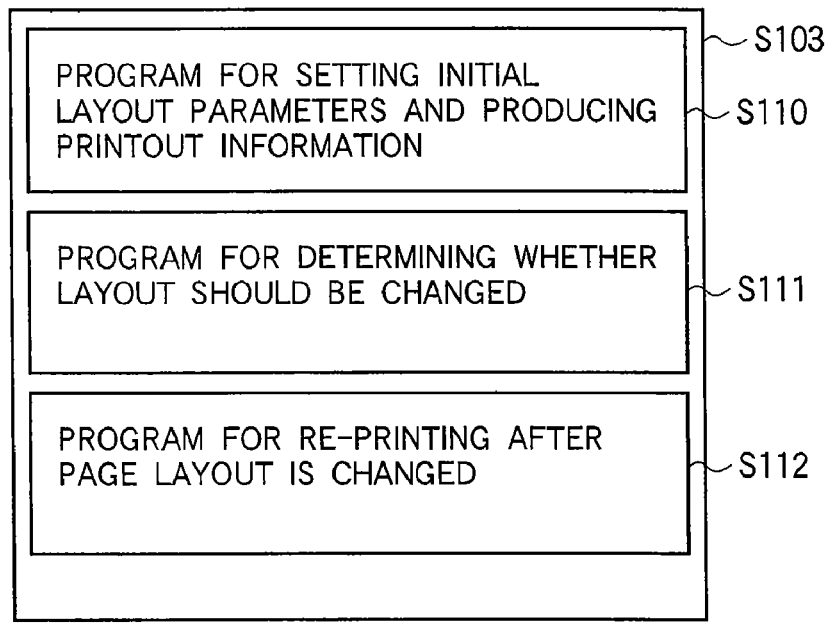
FIG. 14 is a block diagram of a ROM of the second embodiment.

FIG. 14 is a block diagram of the ROM 103. The ROM 103 stores a program 110 for setting initial layout parameters and for processing printout information, a program 111 for determining whether the page layout should be changed, and a program 112 for re-printing after the page layout is changed.

Figure 15:
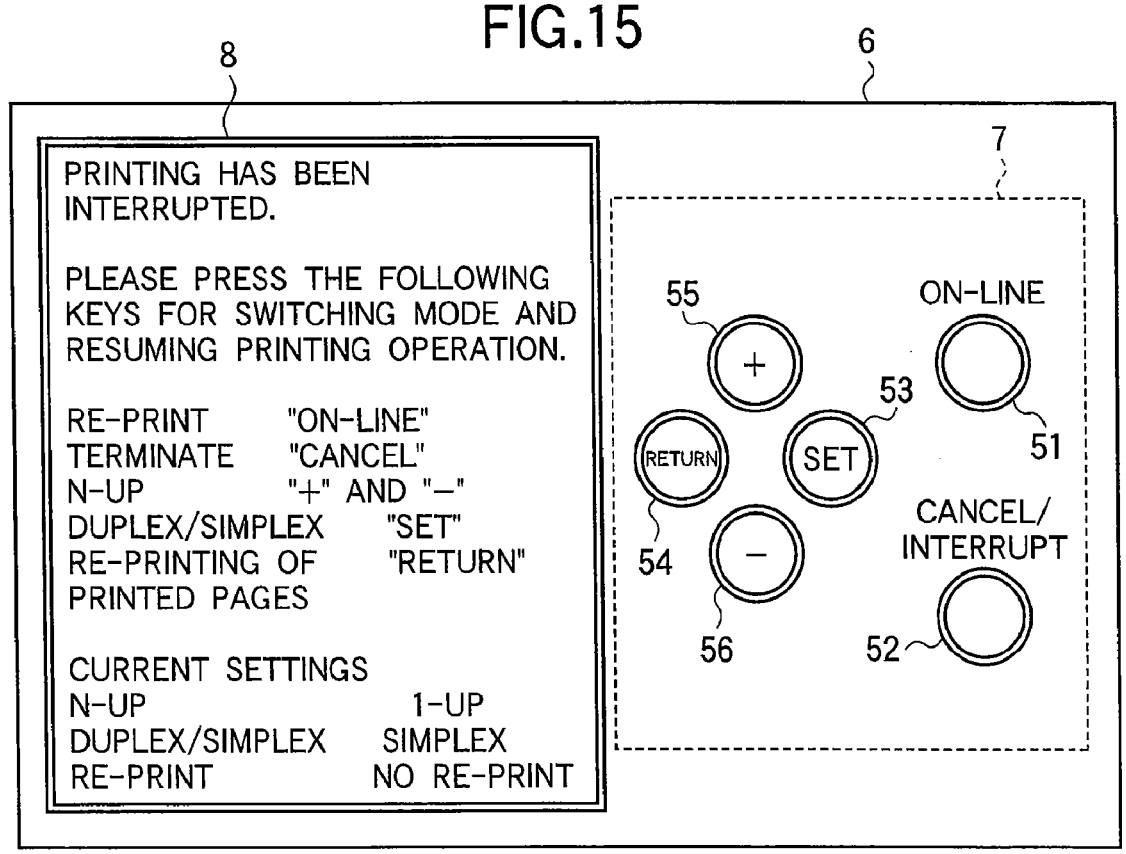
FIG. 15 illustrates an operation panel, which shows an example of the information on the display and operation keys.

FIG. 15 illustrates an operation panel 6, which shows an example of the information on the display 8 and operation keys 7, by means of which the user inputs a change in page layout. It is to be noted that the display 8 of the second embodiment differs from the display 8 of the first embodiment in that the display screen includes "RE-PRINTING OF PRINTED PAGES" and "RE-PRINT." "RE-PRINTING OF PRINTED PAGES" indicates whether pages of a print job that have been printed in an error page layout should be re-printed. "RETURN" is the selection result when a RETURN key 54 is operated. "RE-PRINT" indicates whether re-printing of the print job has been set.

{Operation}

A description will be given of the operation of the apparatus of the aforementioned configuration.

The CPU 11 (FIG. 13) of the image processing section 102 processes the received document information under the control of programs stored in the ROM 103.

Figure 16:
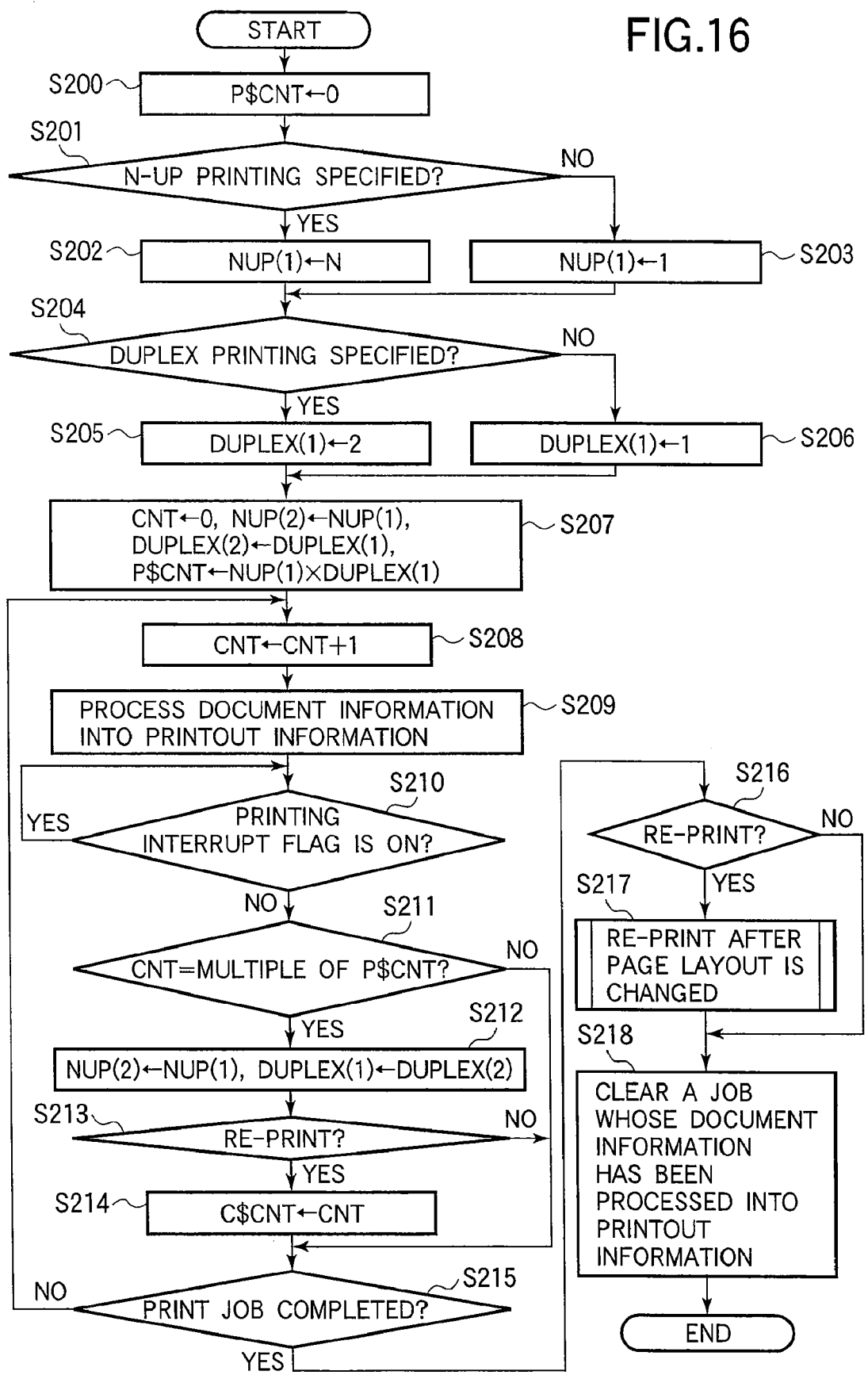
FIG. 16 is a flowchart illustrating a program of the second embodiment for setting initial layout parameters and for processing the document information into printout information.

FIG. 16 is a flowchart illustrating the program 110. The operation will be described with reference to FIGS. 12 to 13 and 3.

The content of P$CNT is initialized, i.e., "0" is input into P$CNT (S200). The CPU 11 determines whether the document information received from the host computer 2 (FIG. 1) specifies N-up printing (S201). If YES, then a value of "N" is input into NUP(1) (S202). If NO, then "1" is input into NUP (1) (S203). NUP(1) is a variable that holds the page layout parameter contained in the document information, indicating the number of document pages N to be formatted side-by-side across a sheet of paper. The content of NUP(1) is n-th power of "2". A check is made to determine whether the document information received from the host computer 2 specifies duplex printing (S204). If YES, it is determined that the document information specifies duplex printing, and therefore "2" is input into DUPLEX(1) (S205). If NO, it is determined that the document information specifies simplex printing, and therefore "1" is input into DUPLEX(1) (S206).

Then, the respective parameters are initialized (S207). That is, "0" is input into CNT. The contents of NUP(1) and DUPLEX(1) are input into NUP(2) and DUPLEX(2), respectively. The multiplication of DUPLEX(1) and NUP(1) is put into P$CNT.

Then, CNT is incremented by 1 (S208). The received document information temporarily stored in the RAM 13 is converted into printout information on a document page-by-document page basis in accordance with the contents in NUP (1) and DUPLEX(1). The printout information is then stored back into the RAM 13, so that the printout information is subsequently outputted from the RAM 13 on an output page-by-output page basis to the printing mechanism 5 (S209).

Upon completion of the processing of document information into printout information for one output page, a check is made to determine whether a printing interrupt flag has been set (S210). If YES, then the program waits until the flag is cleared (S210). The printing interrupt flag is set when the page layout is switched (e.g., from 1-up/simplex printing to 4-up/simplex printing).

{Switching Page Layout}

Switching of page layout will be described later with reference to FIG. 17.

During the printing, the image processing section 4 makes a decision to determine whether the content of CNT is a multiple of that of P$CNT (S211). If YES, the image processing section 4 determines that the page layout can be switched beginning from the document page next to a document page that is currently being converted, and changes the contents of the layout parameter variables (S212). Specifically, the content of NUP(2) is input into NUP(1) and the content of DUPLEX(2) is input into DUPLEX(1) If NO at S211, the program jumps to S215.

A check is made to determine whether printing in a new page layout should be performed on the document pages that have been printed before the new page layout is specified (S213). If YES, the content of CNT is input into C$CNT (S214). If NO, the program jumps to S215. CNT is a variable that serves as a page counter indicative of the page number of a document page that is currently being converted into the printout information. C$CNT is a variable that indicates how far page of the document information has been printed out before the user changed the page layout. If the document pages should be re-printed in a new page layout, the CPU 11 makes a decision based on the content of C$CNT to determine whether how far document page has been printed out in the old page layout.

If the content of CNT is not a multiple of the content of P$CNT at S211, the program jumps to S215.

Upon completion of the conversion of the document information into the printout information for one output page, a check is made to determine whether the final page of the print job has been printed out (i.e., whether the next page of document information to be printed exists in the same print job) (S215). If NO, the program loops back to S208 to repeat steps S208-S214. If YES, the program proceeds to S216 where a check is made to determine whether the print job should be re-printed. If YES at S216, the program proceeds to S217. At S217, the program 112 where re-printing is performed after the page layout is changed 112 is executed. If NO at S216, the program jumps to S218 where the document information for the print job temporarily stored in the RAM 13 is cleared (S218). This completes the printing of the job.

A description will be given of the operation in which the page layout is changed in the middle of printing.

When the CANCEL/INTERRUPT key 52 (FIG. 15) is pressed when steps S208-S215 in FIG. 16 are being executed, the panel controller 9 (FIG. 12) notifies the image processing section 102 of the fact that the CANCEL/INTERRUPT key 52 has been pressed. Thus, the CPU 11 (FIG. 13) of the image processing section 4 knows that the CANCEL/INTERRUPT key 52 has been pressed, and sends a message to be displayed on the display 8 to the panel controller 9. The panel controller 9 causes the display 8 to display the received message. The message is, for example, "PRINTING HAS BEEN INTERRUPTED. PLEASE PRESS FOLLOWING KEYS FOR SWITCHING PRINTING MODE OR FOR RESUMING PRINTING OPERATION". Specific examples of changing the page layout are as follows: The value of N of N-up printing is changed by means of a "+" key 55 and a "–" key 56. A SET key 53 is pressed to toggle between DUPLEX printing and SIMPLEX printing. In the second embodiment, the RETURN key 54 is assigned a function where the user is allowed to select whether output pages printed in an error page layout should be re-printed in a new page layout. A press of the RETURN key 54 initiates re-printing.

Figure 17:
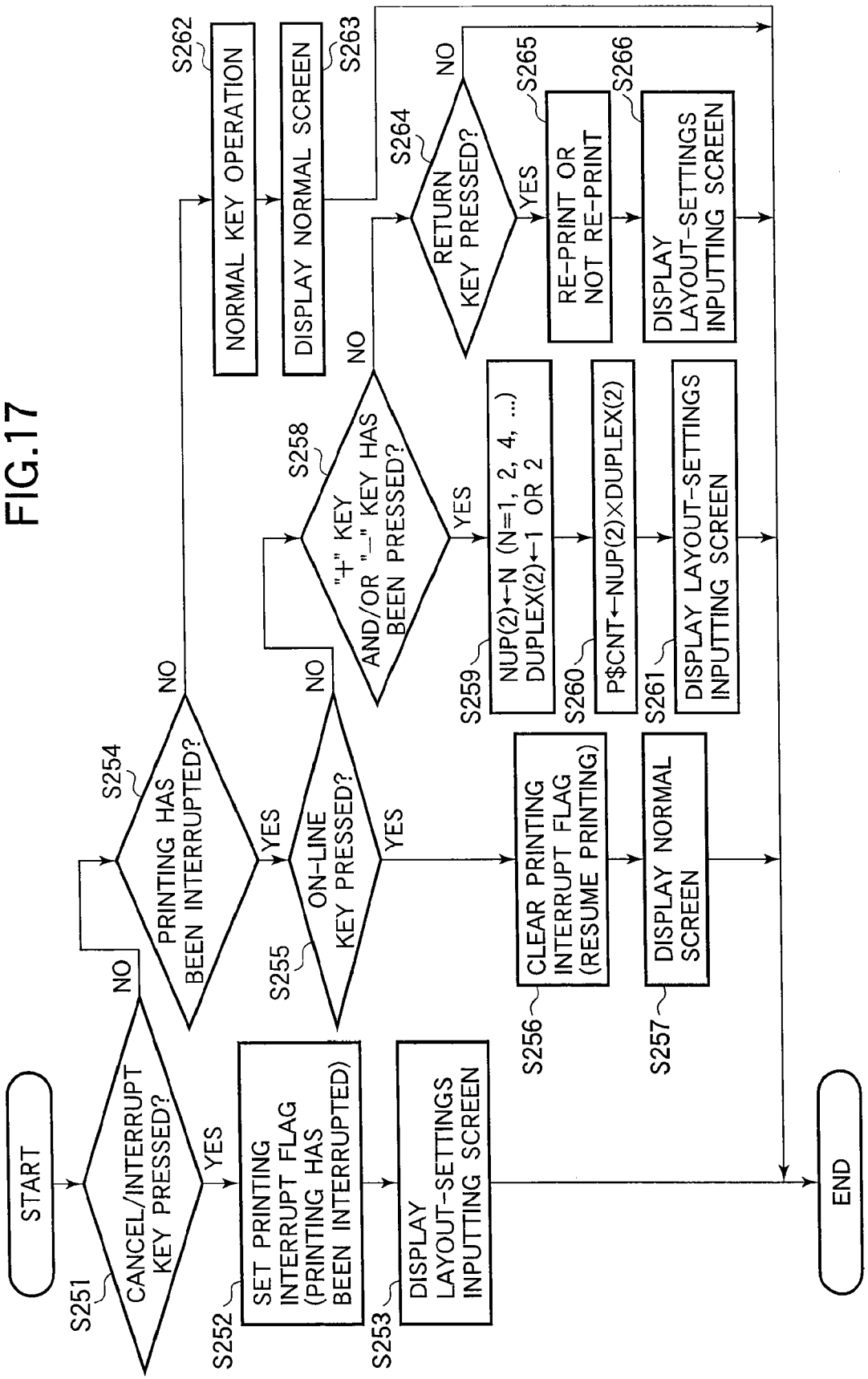
FIG. 17 is a flowchart illustrating a program executed when the user operates the operation keys to input a change in page layout in the middle of printing.

FIG. 17 is a flowchart illustrating the program 120 executed when the user operates the keys to input a change in page layout in the middle of printing. The program in FIG. 17 is activated every time the user inputs a change in page layout from the operation keys 7. The operation will be described with reference to FIGS. 3, 12-13 and 17.

The flowchart in FIG. 17 differs from the flowchart in FIG. 7 in that steps S264-S266 are added. Steps S251-S263 in FIG. 17 are the same as steps S151-S163 in FIG. 7, and their description is omitted. The steps S264-S266 are executed when the CPU 11 determines at S259 that keys (i.e., keys 53, 55, 56) for changing the page layout have not been pressed.

When printing remains interrupted or when it is determined that the ON-LINE key 51 (FIG. 15) and the keys 53, 55, and 56 have not been pressed ("NO" at S255 and S259), a check is made to determine whether the RETURN key 54 (FIG. 15) has been pressed (S264). The RETURN key 54 is pressed by the user to initiate re-printing such that document pages that have been printed are re-printed in a new page layout. The RETURN key 54 is pressed to toggle between "re-print" and "not re-print" (S265). "RE-PRINTING" on the display 8 is updated to indicate either "re-print" or "not re-print" depending on the toggled position of the RETURN key 54.

Figure 19:
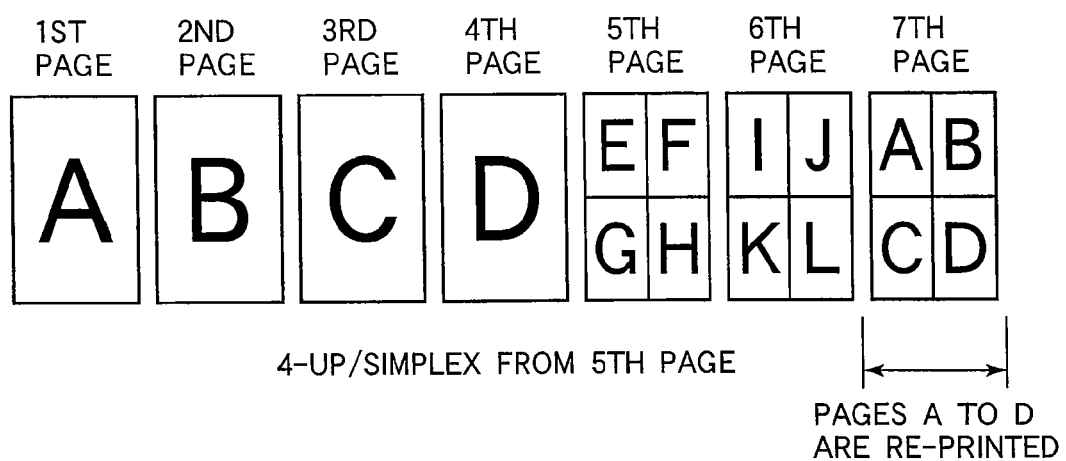
FIG. 19 illustrates an example in which the page layout is switched from one layout to another in the middle of conversion from the document information to the printout information.

FIG. 19 illustrates an example in which the page layout is switched from one layout to another in the middle of the conversion from the document information to the printout information. Assume that a print job contains document pages "A" to "L", and that steps S208-S215 in FIG. 16 are being carried out to perform printing in 1-up/simplex printing (i.e., (NUP(1)=1 and DUPLEX(1)=1)). Further assume that when the first output page or the second document page is being converted into the printout information, the user becomes aware of an error in page layout.

As illustrated by the flowchart in FIG. 17, the user interrupts the print job, for example, before the document information for the third output pages is converted into printout information. The user switches the page layout from 1-up/simplex printing to 4-up/simplex printing, and then resumes the print job. Switching to 4-up/simplex printing is withheld until the content of CNT is equal to that of P$CNT (=4), so that 4-up/simplex printing is performed for the fifth output page and onward. The printing completes at the sixth output page.

After all pages have been printed out, a check is made at step S216 to determine whether the print job should be re-printed. In other words, a check is made to determine whether the RETURN key 54 is pressed to select "re-print" and "not re-print" at S265 in FIG. 17. If "re-print" has been selected, document page A to document page D are re-printed as the seventh page in 4-up/simplex printing (S217).

Figure 18:
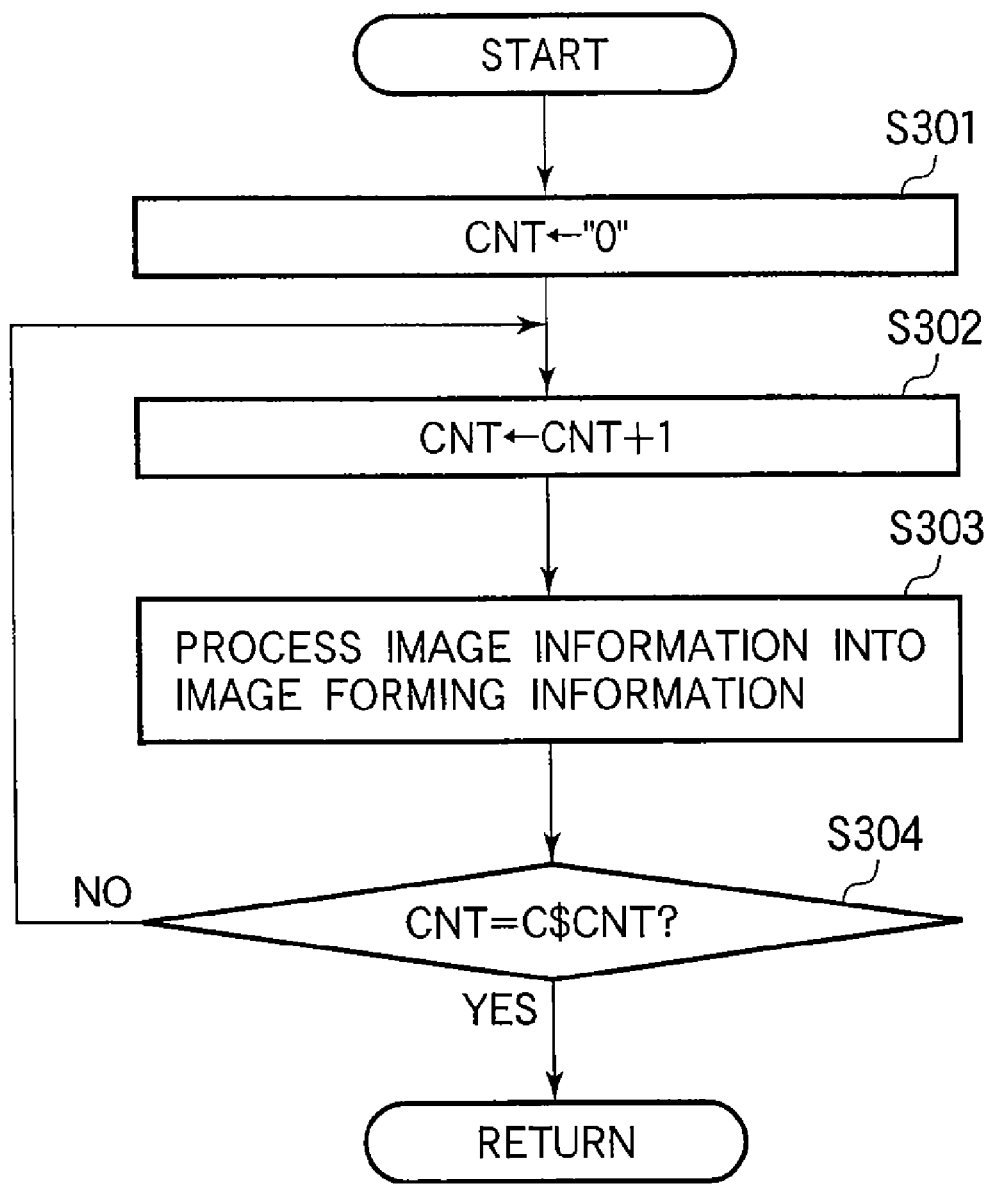
FIG. 18 is a flowchart illustrating the detail of the operation at S217 of a program in FIG. 16.

FIG. 18 is a flowchart illustrating the detail of the operation at S217 of the program 110, S217 being executed for re-printing after changing layout parameters (e.g., N-up printing and duplex/simplex printing). A description will be given of the operation for re-printing document pages, which have been printed in the old page layout, in the new page layout.

First, the content of CNT is reset to "0" (S301). Then, CNT is incremented by 1 (S302). As described previously, the document information temporarily stored in the RAM 13 is converted into the printout information on an output page-by-output page basis according to the contents of NUP(1) and DUPLEX(1) in the new page layout, the conversion being carried out beginning with the first output page. Then, the printout information is temporarily stored back into the RAM 13 (S303).

A check is made to determine whether the content of C$CNT is equal to the content of CNT (S304). If C$CNT is not equal to CNT, steps S302-S304 are repeated to continue conversion of the document information into the printout information. When C$CNT=CNT, the conversion of the document information into the printout information completes. As a result of the process in FIG. 18, the seventh output page includes four document pages, i.e., document pages A to D as shown in, FIG. 19.

For example, assume the following parameters.

$n_i$: The number of pages of the document information that have been converted into the printout information before the user inputs a new page layout including a duplex printing mode.

$n_k$: The number of pages of the document information to be converted before CNT reaches a multiple of the content of P$CNT after the user inputs the new page layout including the duplex printing mode.

The conversion of the document information into the printout information in the new page layout begins from a page of the document information shortly after the value of $(n_i+n_k)$ becomes a multiple of the content of P$CNT. The content of P$CNT is 2N where "2" denotes the duplex printing mode and "N" indicates N-up printing. Thus, because $(n_i+n_k)$ is a multiple of the content of P$CNT, if re-print of the document information is performed, the page 1 to page $(n_i+n_k)$ of the document information may be printed in the new page layout such that the page 1 to page $(n_k+n_i)$ fit to as many physical sheets as $(n_i+n_k)$/P$CNT.

As described above, in addition to the advantages of the first embodiment, the second embodiment has an advantage that document pages printed in an erroneous page layout can be automatically re-printed. The feature of automatic re-printing eliminates the inconvenience of manual key operations for re-printing.

Although the embodiments have been described in terms of an electrophotographic printer, the invention is not limited to the electrophotographic printer. The invention may be applied to an ink jet type printer, a thermal printer, a copying machine, and a multi-function printer (MFP) that performs functions of printing, recording, reading, and communicating images.

What is claimed is:

1. An image forming apparatus comprising:
   an image-processing section that converts first information into second information, the first information being in a first page layout in which a first integral number of pages of the first information are laid out on a sheet of recording medium;
   an image forming section that prints the second information on the sheet of recording medium; and
   a layout-commanding section that commands to switch the second information from the first page layout to a second page layout in which a second integral number of pages of the first information are laid out on the sheet of recording medium;
   wherein when said image-processing section is converting a page of the first information into the second information, if said layout-commanding section commands to switch the second information from the first page layout to the second page layout, said image-processing section converts at least the page of the first information into the second information such that the second information is in the first page layout, and after converting at least the first page, then converts a remaining portion of the first information into the second information such that the second information is in the second page layout, and
   wherein when said image forming apparatus is performing printing of a page in the first page layout, if said layout-commanding section commands to switch from the first page layout to the second page layout, the printing is continued until the page in the first page layout has been printed, then printing is interrupted, and thereafter, a remaining portion of the first information is converted into the second information such that the second information is printed in the second page layout.

2. The image forming apparatus according claim 1, wherein the first integral number is 1 and the second integral number is greater than 1.

3. The image forming apparatus according to claim 1, wherein said image processing section includes a page counter that indicates a page number of the first information that is currently converted into the second information,
   wherein when said image-processing section is converting a page of the first information into the second information, if said layout-commanding section commands to switch the second information from the first page layout to the second page layout, said image-processing section converts the first information into the second information such that the second information is in the first page layout until the counted page number becomes a multiple of the integral number of pages of the first information in the second page layout, and then converts a remaining portion of the first information into the second information such that the second information is in the second page layout.

4. The image forming apparatus according claim 3, wherein said layout-commanding section is capable of commanding either simplex printing or duplex printing, wherein when said layout-commanding section commands to switch the second information from the first page layout to the second page layout while also commanding to switch from simplex printing to duplex printing, said image-processing section continues to convert the first information into the second information such that the second information is in the first page layout until the counted number of page becomes a multiple of 2N, where N is the integral number of pages of the first information in the second page layout, and then converts a remaining portion of the first information into the second information such that the second information is in the second page layout for said image forming section to perform duplex printing of the second information in the second page layout.

5. The image forming apparatus according claim 3, wherein said image processing section performs conversion of a portion of the first information into the second information such that the second information is in the second page layout, the portion being one or more pages of the first information that were converted into the second information in the first page layout before the page layout was switched from the first page layout to the second page layout.

6. The image forming apparatus according claim 4, wherein said image processing section performs conversion of a portion of the first information into the second information such that the second information is in the second page layout, the portion being one of more pages of the first information that were converted into the second information in the first page layout before the page layout was switched from the first page layout to the second page layout.

7. The image forming apparatus according claim 1, wherein the integral number is n-th power of 2.

* * * * *